Patented May 18, 1954

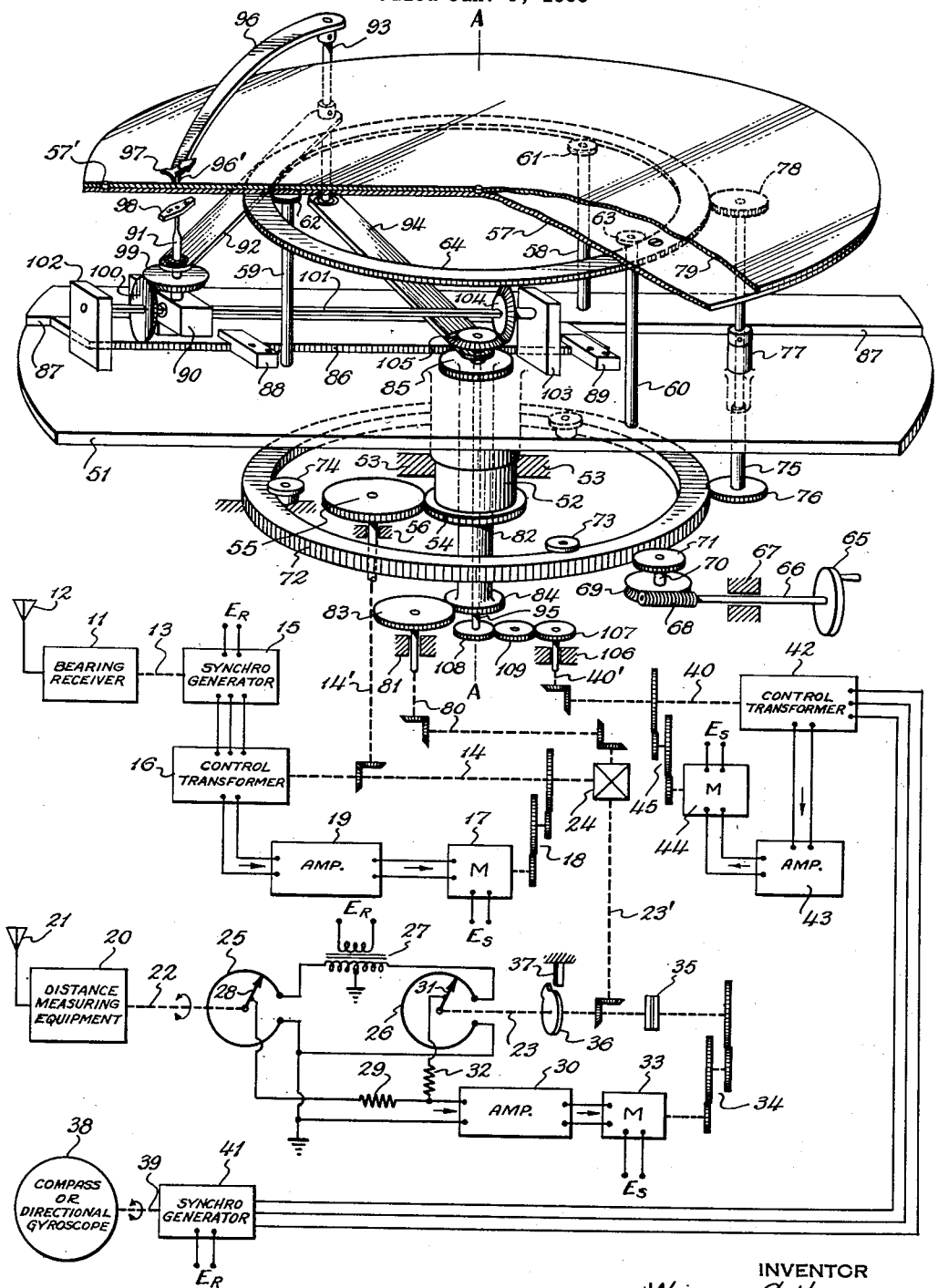

2,679,033

UNITED STATES PATENT OFFICE 2,679,033

PICTORIAL INDICATOR

William C. Hartman, Levittown, N. Y., assignor to
The Sperry Corporation, Great Neck, N. Y., a
corporation of Delaware Application January 5, 1953, Serial No. 329,595

15 Claims. (Cl. 340—24)

This invention relates to pictorial indicators, and in particular, to pictorial indicators for continuously indicating the position of a mobile craft relative to a reference station.

In copending application S. N. 195,761, filed November 15, 1950, entitled "Aircraft Navigation System," and assigned to the same assignee as the present application, a pictorial indicator is disclosed for continuously indicating the position of a mobile craft relative to a reference ground station. This pictorial indicator includes a circular table adapted to carry a map of the terrain surrounding the reference station. A carriage is supported above the map table for radial motion thereover on guide means such as a pair of parallel rods forming a track. The carriage is automatically positioned along the track relative to the center of the map by a suitable radio distance measuring equipment and a servo control system in accordance with changes in distance between the mobile craft and the reference station. The track is supported from a deck situated below the map table, and the deck is automatically rotated about an axis extending through the center of the map table by suitable radio bearing determining apparatus and a servo control system in accordance with the bearing of the mobile craft relative to the reference station. A member attached to the carriage for representing the mobile craft is thus positioned along with the carriage over the upper surface of the map in polar coordinates, the center of the map denoting the reference ground station.

It is desirable in navigational pictorial indicators of the above type to display and to permanently record the path followed by a mobile craft with a minimum of obstruction to the viewing surface of the map, and with maximum compactness in the indicator. It is also desirable to provide simple mechanisms for continuously indicating the path followed by a mobile craft and to provide for the rapid change of maps as the mobile craft moves from one reference station to another. Furthermore, it is important that the position of the mobile craft be indicated in true polar coordinates as radial distance from an angle about the center of the map.

Certain prior pictorial indicator systems, while indicating and recording the values of two variables in true polar coordinates, obstruct certain portions of the viewing surface of the map or chart. Other known types of polar coordinate indicator systems such as cathode ray indicators are not suitable for providing a permanent record of the values of the two variables being indicated. While there exists one type of prior indicator system which does not have the obstruction problem and does provide a permanent record of the values of two variables, it does not indicate the values of these variables in true polar coordinates. This latter system indicates the value of one of the variables as distance from the center of a chart along an arcuate line extending from the center to the edge of the chart.

Accordingly, an object of the present invention is to provide an improved pictorial indicator.

Another object of the invention is to provide a pictorial indicator suitable for displaying and permanently recording on a map the path followed by a mobile craft as it moves relative to a reference station with a minimum of obstruction to the viewing surface of the map.

Still another object of the invention is to provide a navigational pictorial indicator including a path tracing system for denoting craft position on a circular table with a minimum of obstruction, and with the table and path tracing system arranged for maximum compactness of the indicator for all craft position indications.

Yet another object of the invention is to provide a reference table with a movable member thereabove controlled according to the position of a movable body therebelow, without passing any intercoupling elements through the reference table.

In accordance with the present invention there is introduced an improved pictorial indicator for indicating the values of two variables in true polar coordinates. The indicator includes a circular table suspended adjacent to and separated from a rotatable platform. The table and the platform are adapted for relative motion therebetween about an axis extending through the center of the table. The rotatable platform carries a linearly movable body situated in the space between the table and the platform. The movable body is positioned along a radial line from the axis according to one variable, and is positioned along with the rotatable platform about the axis according to the other variable. The movement of the body is transferred from below the table into the movement of a fiducial point on a member above the table by a mechanical linkage.

The mechanical linkage includes first and second arms pivoted together near the edge of the table and located between the lower or rear surface of the table and the rotatable platform. The first arm is further pivoted at the axis and the second arm is further pivoted at the movable body. One end of the member adapted for movement over the upper or front surface of the circular table is rigidly attached to the second arm near the pivot position of the first and second arms. A fiducial point near the other end of the member is situated over the upper surface of the table at a position corresponding to the pivot position of the second arm on the movable body adjacent the lower surface of the table. The fiducial point on the member adjacent to the upper surface of the table moves over the surface of the table as distance from and angle about the center of the table in true polar coordinates in accordance with the movement of the movable body adjacent the lower surface of the table.

The above objects of and the brief introduction to the present invention will be more fully understood and further objects and advantages will become apparent from a careful study of the following detailed description in connection with the drawing, wherein:

The single figure of the drawing shows a schematic perspective diagram of the pictorial indicator of the invention as employed in conjunction with suitable radio navigational aids to indicate the position of a movable craft relative to a reference station, and in conjunction with a compass to indicate the craft's heading.

Referring to the single figure, the pictorial indicator and radio navigational aids may be employed in a mobile craft, as for example, an aircraft, to provide a continuous indication of the craft's position in bearing and distance relative to a reference station, such as the Civil Aeronautics Administration's Omni-Bearing Distance (OBD) ground station. The radio navigational aids include a conventional bearing receiver for determining the bearing of the aircraft relative to the OBD station, and a conventional distance measuring equipment for determining the distance between the aircraft and the OBD station. In addition, the aircraft's heading may be determined by a compass or directional gyroscope, and displayed by the pictorial indicator as direction of a small heading arrow. Bearing, distance and heading information is supplied continuously to the pictorial indicator of the present invention as angular position of three separate shafts.

The bearing of the aircraft is measured by the conventional bearing receiver 11, which receives bearing determining signals from the OBD ground station over antenna 12. Bearing information is provided at the output of receiver 11 as angular position of shaft 13, and the angular position of this shaft is transferred by a conventional servo system into corresponding angular position of a remote shaft 14 for actuating the pictorial indicator.

The servo system comprises a synchro generator 15 whose rotor is mechanically coupled to shaft 13. The single winding of synchro generator 15 is excited by a fixed reference voltage $E_r$, such as a 400 cycle line voltage, and its multiple winding system is electrically connected to the multiple winding system of a control transformer 16. The rotor of control transformer 16 is mechanically coupled to shaft 14 which is positioned by the servomotor 17 through reduction gears 18. The output error control voltage across the single output winding of control transformer 16, whose reversible phase and magnitude is determined by the relative angular displacement between the positions of shafts 13 and 14, is amplified by amplifier 19 and applied to servomotor 17. The servomotor 17, which may be of the two-phase type and thus is supplied with a fixed voltage $E_s$ in phase quadrature with voltage $E_r$, rotates shaft 14 through the reduction gears 18 until its angular position conforms with the angular position of shaft 13, thereby reducing the output error control voltage to zero.

The distance between the aircraft and the ground station is measured by a conventional distance measuring equipment 20, which initiates and receives distance determining signals from the OBD ground station responder over antenna 21. Distance information is provided at the output of equipment 20 as angular position of a shaft 22, and the angular position of this shaft is transferred by a conventional potentiometer servo control system into corresponding angular position of a remote shaft 23 for actuating the pictorial indicator through a mechanical differential 24.

The servo system comprises first and second potentiometers having resistance windings 25 and 26 respectively. The lower terminal of each of these windings is electrically connected to a common ground terminal. The upper terminal of winding 25 is supplied with a reference voltage from one-half of the secondary winding of transformer 27, and the upper terminal of winding 26 is supplied with a reference voltage of opposite phase from the other half of the secondary winding of transformer 27, the center tap of the secondary winding being connected to the common ground terminal. The primary winding of transformer 27 is energized by the reference voltage $E_r$.

The wiper arm 28 of the first potentiometer is mechanically coupled to shaft 22 and electrically connected through a series resistor 29 to a first input terminal of amplifier 30. The second input terminal of amplifier 30 is connected to a common ground terminal. The wiper arm 31 of the second potentiometer is mechanically coupled to shaft 23 and electrically connected through a series resistor 32 to the first input terminal of amplifier 30.

The angular position of shaft 23 conforms with the angular position of shaft 22 when wiper arm 31 extends in a direction parallel to the direction of wiper arm 28. For this condition, the output voltage between arm 28 and ground is equal in magnitude and opposite in phase to the output voltage between arm 31 and ground, and the resulting error control voltage across the input terminals of amplifier 30 is zero. When the angular positions of shafts 23 and 22 are initially displaced relative to each other, an error control voltage is developed across the input terminals of amplifier 30 whose phase and magnitude is determined by the relative angular displacement. This control voltage is amplified and applied to servomotor 33 to rotate shaft 23 through reduction gears 34 and slip clutch 35 in a direction to bring its angular position into agreement with the angular position of shaft 22. Servomotor 33 is supplied with a reference voltage $E_s$ in phase quadrature with the voltage $E_r$.

A cam 36 is mounted on and pinned to shaft 23 to serve as a limit stop when it is driven against stop pin 37 at each end of the travel of arm 31 of the second potentiometer.

The heading of the aircraft is determined by its own compass system 38, which may include a directional gyroscope, and this information is provided as the angular position of a shaft 39 coupled to the compass. The angular position of shaft 39 is transferred by a conventional servo system into corresponding angular position of a remote shaft 40 for actuating the heading arrow of the pictorial indicator.

The heading servo system coupled between shafts 39 and 40 and including a synchro generator 41, a control transformer 42, an amplifier 43, a servomotor 44, and reduction gears 45, may be identical to the servo system coupled between shafts 13 and 14 as shown and described in the bearing channel.

The pictorial indicator of the present invention comprises a platform 51 supported by a hollow shaft 52 extending through main bearing 53. The platform 51 is adapted for angular movement about the longitudinal axis A—A of hollow shaft 52. A small ring gear 54 is attached to the outside surface and near the lower end of hollow shaft 52, and is driven by spur gear 55 attached to the upper end of shaft 14' extending through bearing 56.

A thin circular table 57 is suspended above platform 51 by three supporting columns or posts 58, 59 and 60 rigidly attached to the platform. Three disc rollers 61, 62 and 63 are pivoted atop posts 58, 59 and 60, respectively, for rotation about a longitudinal axis parallel to axis A—A. These rollers have rounded edges for engaging the grooved inner periphery of a ring gear 64, thus supporting the ring gear for angular rotation about axis A—A. Table 57 is attached to and supported by the ring gear 64 in such a way that axis A—A passes through the center of the table.

The table 57 may be rotated about axis A—A independently of any motion of platform 51 by rotating crank 65 situated below the platform and attached to one end of a shaft 66. Shaft 66 extends through a bearing 67 to a worm element 68 engaged with worm wheel 69 for driving a shaft 70. A spur gear 71 attached to shaft 70 drives a ring gear 72. The ring gear 72 is supported for rotation about axis A—A and is retained in position by retaining rollers schematically illustrated at 73 and 74.

Rotation of ring gear 72 about axis A—A drives a shaft 75 through spur gear 76, the platform 51 remaining stationary due to the reduction gears 18 between shafts 14', 14 and motor 17. Shaft 75 extends in a direction parallel to axis A—A and passes through platform 51. It is supported at the platform 51 by a bearing 77. Spur gear 78 attached to the upper end of shaft 75 rotates the ring gear 64 on the rollers 61, 62 and 63, and the table 57 supported by this ring gear about axis A—A. Thus, rotating crank 65 causes ring gear 72 and table 57 to be rotated in unison without imparting any movement to platform 51.

While one revolution of table 57 and ring gear 64 is produced for each revolution of ring gear 72, as illustrated in the single figure, this specific relationship is not necessary. The table 57 could be rotated either faster or slower than the angular rotation of ring gear 72 if desired, according to the ratios of gears 76 and 78 with their respectively meshed ring gears.

The platform 51 is also rotatable about axis A—A without imparting movement to table 57. Rotation of platform 51 about axis A—A causes shaft 75 to rotate within its bearing 77 as it is carried by the platform around axis A—A. The ring gear 72 is held stationary by the holding action of the worm gear 68 and 69 thus preventing table 57 from moving as spur gear 78 travels about the periphery of ring gear 64. Spur gear 76 also travels about the periphery of ring gear 72 and passes over the top of spur gear 71.

Table 57 is adapted for supporting a circular map of the terrain surrounding a selected OBD ground station. The map may be attached to the upper surface of a detachable circular plate 79, and the circular plate may be sloted or keyed, as at 57', so that when placed upon table 57 it can be quickly oriented to a predetermined reference position and fastened to the table.

The angular position of shafts 14 and 14', varying according to changes in the bearing of the aircraft relative to the OBD station, determines the angular position of platform 51 about axis A—A. A 360 degree change in the aircraft's bearing turns shafts 14, 14', and platform 51 through exactly one revolution. Shaft 14', therefore, is one input to the pictorial indicator, and its angular position varies directly according to one of the variables to be indicated.

The angular position of shaft 23 represents another variable to be indicated, i. e. the distance between aircraft and OBD station. Shaft 23 drives shaft 23' which in turn is coupled through mechanical differential 24 to shaft system 80, and shaft system 80 passes through bearing 81 to drive a hollow shaft 82 through spur gears 83 and 84. Hollow shaft 82 is coaxially aligned and supported within hollow shaft 52 and is independently rotatable therein about axis A—A. This hollow shaft 82 extends through an opening in platform 51 to a pinion 85 attached to its upper end. Pinion 85 is engaged with a rack 86 that is linearly slidable over the surface of platform 51 and against a rear guiding surface 87. The rack 86 is held in alignment against guiding surface 87 and the surface of platform 51 by guides schematically illustrated at 88 and 89.

A body or block 90 is rigidly attached near one end of rack 86 for movement therewith over the surface of the platform 51. The body 90 is so shaped and arranged that it can be translated from near the edge of the platform 51 to a position directly above the axis A—A. A shaft 91 is pivotally mounted in a bearing on top of block 90 at a location such that when block 90 is translated to a position directly above axis A—A, the longitudinal axis of shaft 91 coincides with the axis A—A. Moreover, as block 90 is translated along with rack 86 over the surface of the platform, the shaft 91 is translated along a radial line extending from axis A—A toward the edge of the platform according to the distance between the aircraft and the reference ground station. Since the radius vector from axis A—A to shaft 91 is rotated along with platform 51 about axis A—A in accordance with the bearing of the aircraft relative to the ground station, the position at which shaft 91 is situated at any instant thus represents the position of the aircraft in true polar coordinates relative to the axis A—A.

For changes in the aircraft's bearing while distance is constant, the mechanical differential 24 prevents the angular rotation of platform 51 about axis A—A from translating the rack 86 along the surface of the platform. The differential prevents this movement by rotating hollow shaft 82 in the same direction and at the same angular velocity as hollow shaft 52, when shaft system 23' is at rest. The rack 86 and pinion 85 thus remain in the same relative positions as though the platform 51 were stationary.

With changes in the aircraft's distance while bearing is constant, the shaft 14 and platform 51 remain stationary, and shaft 23' drives shaft system 80 through differential 24, thus translating the body 90 on rack 86 relative to axis A—A according to the changes in distance between the aircraft and ground station.

The vector position of shaft 91 relative to axis A—A is transferred from below table 57 to the upper surface of the table by a mechanical linkage including an arm 92 pivoted at one end through a bearing to shaft 91. The other end of arm 92 is attached and pinned to a shaft 93 extending parallel to axis A—A and situated just beyond the edge of table 57. Another arm 94 has one of its ends pivoted through a bearing to the lower end of shaft 93 and its other end pivoted through a bearing to shaft 95 extending through the center of hollow shaft 82. The longitudinal axis of this shaft 95 is the axis A—A.

One end of a curved member 96, preferably formed of rigid transparent material, is attached and pinned to the upper end of shaft 93 which extends slightly higher than the upper surface of table 57. This member is adapted for parallel movement over the upper surface of table 57, and is so aligned that a fiducial point near its other end is situated directly above shaft 91. Moreover, the longitudinal axis of shaft 91 extends through this fiducial point.

Member 96 moves over the upper surface of table 57 in the same manner in which arm 92 moves below the table since they are rigidly joined together. The distance between the longitudinal axis of shaft 91 and the longitudinal axis of shaft 93 is exactly equal to the distance between axis A—A and the longitudinal axis of shaft 93. Thus, the fiducial point on member 96 is made to move over the upper surface of table 57 in true polar coordinates about the center of table 57 when shaft 91 moves in true polar coordinates about axis A—A below the table.

The transparent member 96 is the only necessary part of the indicator that appears over the front surface of the map. Being transparent, it causes substantially no obstruction to the map's viewing surface. Its rigidity enables a small stylus 96' to be mounted at the fiducial point for tracing upon the surface of the map the path followed by the aircraft as it moves in the vicinity of the reference ground station.

The heading of the aircraft may be indicated by the pictorial indicator as direction of a small heading arrow 97 which is shown pivoted on member 96 at the fiducial point. This heading arrow 97 comprises a bar magnet, and its direction is determined by a magnetic field produced by a further permanent magnet 98 situated directly below the heading arrow and adjacent to the lower surface of table 57. Table 57 and circular plate 79 are constructed of non-magnetic material to allow for magnetic coupling between magnet 98 and arrow 97. The magnet 98 is attached to the upper end of shaft 91 for rotation in unison therewith about the longitudinal axis of the shaft.

Shaft 91 is rotated about its longitudinal axis by a mechanical gear system coupling this shaft to shaft 95, and both shafts 91 and 95 rotate in the same direction and at the same angular velocity. Bevel gear 99 pinned to shaft 91 is engaged with bevel gear 100 mounted to body 90 by means of a hollow bearing through which is passed a splined shaft 101. The splined shaft 101 is supported at each end by bearing blocks 102 and 103 mounted on platform 51, and the longitudinal axis of this shaft 101 extends in a direction perpendicular to axis A—A and along a radial line parallel to the sliding surface 87. Bevel gear 100 is keyed in order that it may be slid over the surface of shaft 101 and also be driven by the rotation of shaft 101. Splined shaft 101 is rotated by the shaft 95 through additional bevel gears 104 and 105, and shaft 95 is driven by the shaft 40' passing through bearing 106 to the spur gears 107 and 108, and idler gear 109.

The bevel gears 99 and 100 have a one-to-one ratio as do bevel gears 104 and 105. Thus, one revolution of shaft 95 produces one revolution of shaft 91 and, likewise, one revolution of heading arrow 97. Moreover, the mechanical gear system operates as a differential to rotate shafts 91 and 101 when platform 51 is rotated about axis A—A and shaft 95 is at rest. For example, with a fixed heading, i. e., shafts 40, 40' and 95 being held stationary, and a changing bearing, the platform 51 rotates about axis A—A to indicate the change in bearing and this rotation drives shaft 101 through the bevel gears 104 and 105. The rotation of shaft 101 drives shaft 91 through an angle exactly equal to the angle through which platform 51 is rotated but opposite in direction, and this motion of shaft 91 is such as to maintain the direction of heading arrow 97 fixed, thus indicating a fixed heading.

While, for the purpose of illustration, the pictorial indicator of the present invention has been shown and described in conjunction with suitable radio navigational aids for indicating the position of a mobile craft relative to a reference station, it is by no means limited to this specific use. The pictorial indicator may be employed to indicate the values of any two variables in polar coordinates where the values of the two variables are in a form which can be supplied to the indicator's two input shafts.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pictorial indicator for continuously indicating the position of a mobile craft relative to a reference station, comprising in combination, a platform supported by said craft and rotatable about an axis, means for varying the angular position of said rotatable platform about said axis according to the bearing of said craft relative to said reference station, means including a body situated on said rotatable platform and motive means coupled thereto for providing translational motion of said body along a radial line from said axis according to the range of said craft from said reference station, a table suspended above said platform and adapted for supporting upon its upper surface a map of the terrain surrounding said reference station, a mechanical linkage comprising first and second arms pivoted together and situated in the space between said table and said platform, said first arm also being pivoted at said axis and said second arm also being pivoted at said movable body, and a third arm situated above the upper surface of said map table for parallel movement thereover, said third arm having one end rigidly joined to said second arm for movement therewith, the other end of said third arm being positioned over said map table and being located at a position with respect to said map table corresponding to the pivot position of said second arm on said movable body, whereby the movement of said body according to the bearing and range of said craft relative to said reference station is transferred into movement of a fiducial point near the other end of said third arm over the upper surface of said map table as bearing and range of said craft relative to the center of said map table.

2. A pictorial indicator for continuously indicating the position of a mobile craft relative to a reference station, comprising in combination, a platform supported by said craft and rotatable about an axis, means including a body situated on said rotatable platform and motive means coupled thereto for providing translational motion of said body along a radial line from said axis according to the range of said craft from said reference station, a table suspended above said platform and adapted for supporting upon its upper surface a map of the terrain surrounding said reference station, means for varying the angular displacement between said table and said platform about said axis according to the bearing of said craft relative to said reference station, a mechanical linkage comprising first and second arms pivoted together and situated in the space between said table and said platform, said first arm also being pivoted at said axis and said second arm also being pivoted at said movable body, and a third arm situated above the upper surface of said map table for movement thereover, said third arm having one end rigidly joined to said second arm for movement therewith, the other end of said third arm being positioned over said map table and being located at a position with respect to said map table corresponding to the pivot position of said second arm on said movable body, whereby the movement of said body according to the bearing and range of said craft relative to said reference station is transferred into movement of a fiducial point near the other end of said third arm over the upper surface of said map table as bearing and range of said craft relative to the center of said map table.

3. A pictorial indicator for continuously indicating the position of a mobile craft relative to a reference station, comprising in combination, a platform supported by said craft and rotatable about an axis, means including a body situated on said rotatable platform and motive means coupled thereto for providing translational motion of said body along a radial line from said axis according to the range of said craft from said reference station, a table suspended above said platform and adapted for supporting upon its upper surface a map of the terrain surrounding said reference station, means for varying the angular displacement between said table and said rotatable platform about said axis according to the bearing of said craft relative to said reference station, a mechanical linkage comprising first and second arms pivoted together and situated in the space between said table and said platform, said first arm also being pivoted at said axis and said second arm being further pivoted at said movable body, a member rigidly attached to said second arm and extending in a direction parallel to said axis, said member projecting slightly higher than the upper surface and beyond the rim of said map table, and a third arm situated above the upper surface of said map table and having one end rigidly joined to said member, said third arm being positioned for movement over said map table, the other end of said third arm being located at a position with respect to said map table corresponding to the pivot position of said second arm on said movable body, whereby the movement of said body according to the bearing and range of said craft relative to said reference station is transferred into movement of a fiducial point near the other end of said third arm over said map table as bearing and range of said craft relative to the center of said map table.

4. The apparatus as defined in claim 3, wherein said third arm situated above the upper surface of said map table for movement thereover comprises a heading indicator pivoted at the other end of said third arm at said fiducial point, and means including a rotatable element on said body for positioning said heading indicator in accordance with the heading of said mobile craft.

5. The apparatus as defined in claim 4, wherein said heading indicator pivoted at the other end of said third arm includes a permanent magnet, and said means for positioning said heading indicator includes a further permanent magnet located beneath said table and pivoted on said body.

6. The apparatus as defined in claim 3 wherein said third arm situated above the upper surface of said map table for movement thereover is curved to conform with the curvature at the rim of said map table.

7. The apparatus as defined in claim 3, wherein said third arm situated above the upper surface of said map table for movement thereover is formed of rigid transparent material.

8. The apparatus as defined in claim 3 wherein said third arm situated above the upper surface of said map table for movement thereover includes a stylus attached to the other end of said third arm at said fiducial point, said stylus being adapted for tracing the position of said mobile craft on said map table in accordance with the range and bearing of said mobile craft relative to said reference station.

9. The apparatus as defined in claim 3 further including means for positioning said map table relative to said craft independently of the position of said platform.

10. A pictorial indicator for continuously indicating the values of first and second variables including a body movable in a plane according to said first and second variables, comprising an indicator table having a lower surface suspended adjacent said movable body, said table lying in a plane parallel to the plane of movement of said movable body, means including a mechanical linkage situated below said table and having first and second arms pivoted together about a first axis perpendicular to the plane of said table, said first arm being further pivoted at a second axis paralell to and separated from said first axis and said second arm being further pivoted at said movable body, said pivotal connection about said first axis being substantially equidistant from said second axis and said pivotal connection on said movable body, and a rigid member fixedly connected to said second arm in the region of said pivotal connection about said first axis and extending therefrom and outside the perimeter of said table to a position over the upper surface of said table directly above said movable body for transferring the motion of said movable body below said table into movement of a fiducial point near the end of said rigid member over the upper surface of said table.

11. In combination, a circular disc table, a first arm beneath said table pivoted about the axis of symmetry of said table, a second arm beneath said table pivotally connected to said first arm about an axis parallel to said axis of symmetry and at a distance from said axis of symmetry slightly greater than the radius of said table, a movable body beneath said table connected to said second arm, the pivotal connection between said first arm and said second arm being at substantially equal distances from said axis of symmetry and said connection to said body; and a rigid member fixedly connected to said second arm in the region of the axis of the pivotal connection between said first and second arms and extending therefrom to a position over said table directly above said body and thereby substantially duplicating over the surface of said table the plan position of said body therebelow.

12. A mechanism comprising, a body movable in angular position about an axis and movable along a radial line perpendicular to said axis, a table having an upper and a lower surface, said lower surface suspended adjacent to said movable body, a member situated above the upper surface of said table for movement thereover, means for transferring the motion of said movable body beneath said table into movement of said member above the upper surface of said table, said means including a mechanical linkage having first and second arms pivoted together and situated beneath said table, said first arm being further pivoted at said axis, and said second arm being further pivoted at said movable body, and means rigidly joining one end of said member above the table to said second arm below said table for movement therewith, the other end of said member being located at a position over the upper surface of said table directly above said movable body whereby the movement of a fiducial point on said member above said table in angle about and distance from said axis varies according to the movement of said movable body beneath said table in angle about and distance from said axis.

13. In combination, a body movable in angular position about an axis and movable along a radial line perpendicular to said axis, a circular table having an upper and a lower surface, said lower surface suspended adjacent to said movable body, the center of said circular table coinciding with said axis, a member situated above the upper surface of said table for movement thereover, means for transferring the motion of said movable body beneath said table into movement of said member above the upper surface of said table, said means including an arm situated beneath said table, means pivotally connecting a first point on said arm to said movable body, means pivotally connected to said arm at a second point remote from said first point for maintaining said second point at a fixed radial distance from said axis, and means rigidly joining one end of said member above the table to said arm below said table for movement therewith, the other end of said member being located at a position over the upper surface of said table directly above said movable body whereby the movement of a fiducial point on said member above said table in angle about and distance from the center of said table varies according to the movement of said movable body beneath said table in angle about and distance from said axis.

14. The apparatus as defined in claim 13 wherein the distance between the second point on said arm and said axis is equal to the distance between the first and second points on said arm.

15. A pictorial indicator for continuously indicating the position of a mobile craft relative to a reference station including movable means variable in angular position about an axis according to the bearing of said craft relative to said reference station and variable in position along a radial line from said axis according to the range of said craft from said reference station, comprising a circular table adapted for supporting upon its upper surface a map of the terrain surrounding said reference station, said table lying in a plane perpendicular to said axis and having its lower surface situated adjacent to said movable means, the center of said table coinciding with said axis, a member situated above the upper surface of said table for parallel movement thereover, means for transferring the motion of said movable means beneath said table into movement of said member above said table, said means including a mechanical linkage having first and second arms pivoted together near the rim of and beneath said table, said first arm being further pivoted at said axis and said second arm being further pivoted at said movable means, shaft means situated at a distance from said axis slightly greater than the radius of said table and extending in a direction parallel to said axis and projecting slightly higher than the upper surface of said table, one end of said shaft means rigidly joined to said second arm beneath said table and the other end of said shaft means joined to one end of said member above said table, the other end of said member being located at a position over the upper surface of said table directly above said movable means whereby the movement of a fiducial point on said member above said table in angle about and distance from the center of the table varies according to the movement of said movable means beneath said table as angle about and distance from said axis.

References Cited in the file of this patent

UNITED STATES PATENTS

| Number | Name | Date |
|---|---|---|
| 957,050 | Golden | May 3, 1910 |